May 4, 1965 S. R. RABSON 3,181,287
SCRUBBING APPARATUS FOR REMOVING PARTICULATE MATTER FROM AIR
Filed June 4, 1962 2 Sheets-Sheet 1
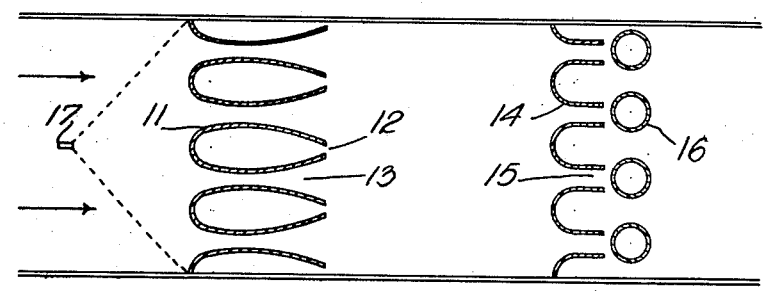
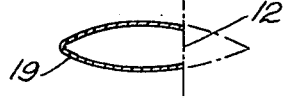
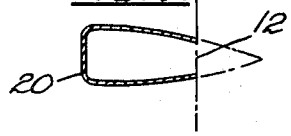
INVENTOR
SOLLY R. RABSON
BY Irwin S. Thompson
ATTY.

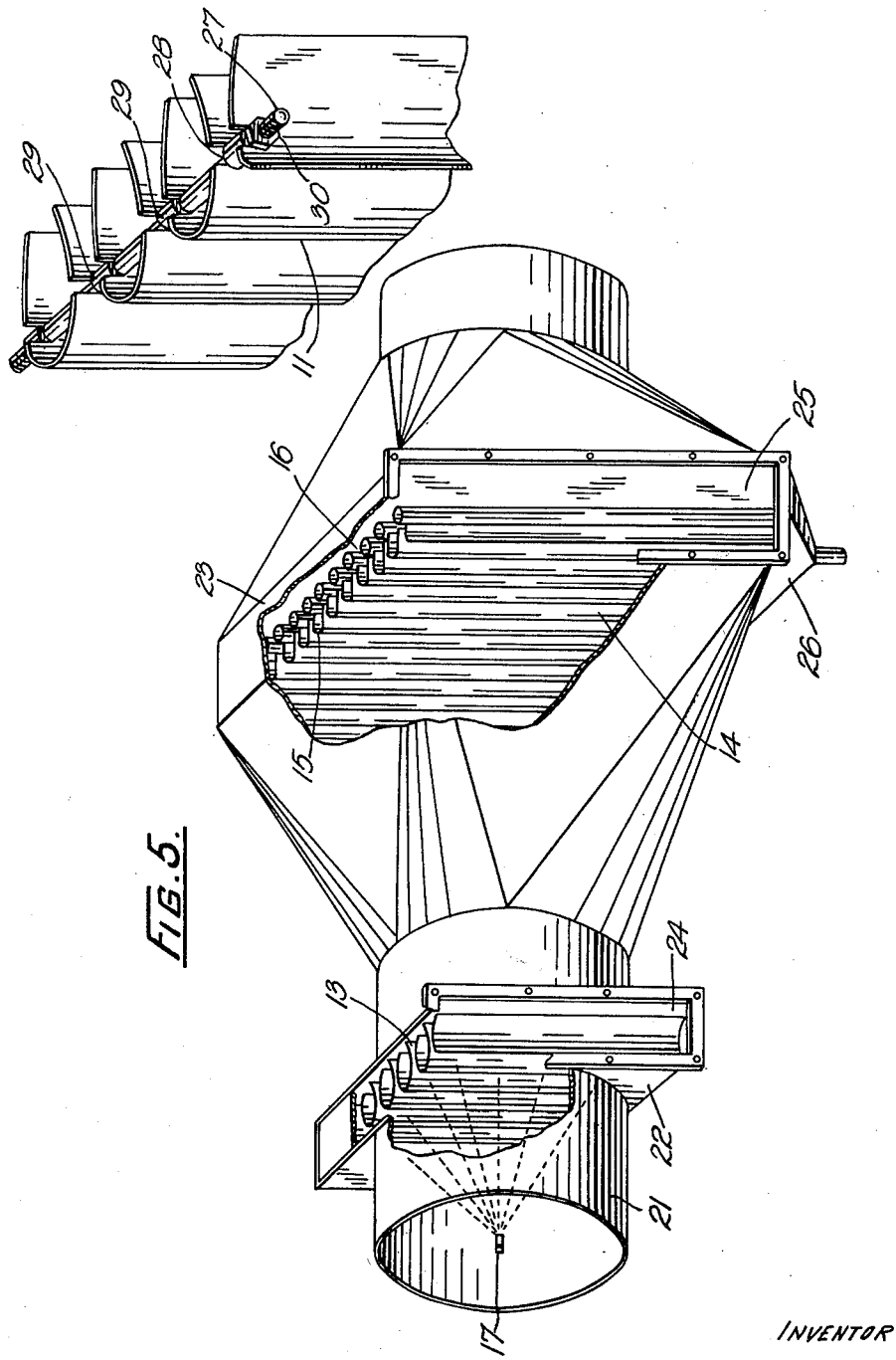

3,181,287
SCRUBBING APPARATUS FOR REMOVING PARTICULATE MATTER FROM AIR
Solly R. Rabson, 8 Wethered St., Greenside Extension, Johannesburg, Transvaal, Republic of South Africa
Filed June 4, 1962, Ser. No. 199,947
Claims priority, application Republic of South Africa, June 14, 1961, 61/211; Jan. 23, 1962, 62/303
1 Claim. (Cl. 55—257)

This invention relates to apparatus for the separation of solid or liquid particulate matter from an air or gas stream.

Apparatus is known in which high velocity effects are utilised by passing the air through an individual venturi i.e. a convergent-divergent passage of circular or rectangular cross-section while subjecting it to a spray of water, so that agglomeration of the dust with the liquid particles may occur as the air passes at high velocity through the throat of the venturi; the agglomerated particles are subsequently collected by means usually of a cyclonic type of separator. Such apparatus generally requires a high water rate for effective application and operates at a high overall resistance or pressure loss.

Modifications of the venturi type separator have been proposed in which the agglomerating action is brought about in a multiplicity of small venturis of conventional circular or conical shape. Such arrangements involve a substantial degree of complication in design and construction when dealing with large volumes of air.

It is an object of the present invention to provide an apparatus utilizing the passage of air at high velocities to achieve separation of dust and mist particles from air or gas streams, in which the disadvantages associated with existing apparatus are reduced.

A further object of the present invention is to provide a simplified apparatus which is compact in size, has a high air throughput and a low water consumption. It is a further object to reduce entrainment and allow operation with high velocities at moderate resistance or pressure loss. A still further object is to provide an apparatus in which the components can readily be adjusted in order to vary the air velocity to suit requirements, and can easily be disassembled and reassembled for cleaning purposes.

According to the invention apparatus for removal of solid or liquid particulate matter from a gas stream includes a primary agglomeration stage comprising a plurality of longitudinal channels of convergent-divergent shape in cross-section formed by adjacent guide elements of substantially aerofoil shape in cross-section, the tapered sections of which are truncated, through which the gas, previously charged with atomised liquid particles if not already containing such liquid particles is caused to pass at high velocity; followed by a secondary separation stage. The combination of high velocity, reduced pressure and turbulence occurring during passage of the air through the narrow throats of the channels, results in agglomeration of the liquid and the dust particles enabling their separation to take place subsequently in the secondary stage which may be any suitable spray separator. The preferred separator comprises a plurality of longitudinal slots of substantially nozzle or convergent shape in cross-section which cause the air to impinge on longitudinal impact members behind the slots and which have a convexly curved surface presented to the gas stream.

The longitudinal venturi channels of the primary stage are formed by positioning adjacent to each other vertical guide elements of substantially aerofoil or stream-lined shape in cross-section, with their rounded "nose" or convex sections presented to the air stream while their tail or trailing sections taper down on the downstream side, the tail or trailing sections being truncated. The separating spaces between such members form a plurality of longitudinal channels, each having a truncated venturi shape in cross-section.

The longitudinal nozzle-shaped slots of the secondary stage are formed by positioning adjacent to each other vertical guide members or elements which are substantially U-shaped in cross-section with their convex portions presented to the air stream, so that the separating spaces between the members form slots of the required convergent nozzle shape.

The use of venturi shaped channels in the agglomeration stage provides the known advantage of pressure recovery which occurs in the divergent section of the venturis thus assisting to keep down the overall pressure loss particularly when high slot or throat velocities are used. In order to obtain the maximum benefit of pressure recovery, the taper of the tail section of the aerofoil elements must be sufficiently gentle to provide a satisfactory divergent section to the venturis. While reasonable results can be obtained with tapers from about 1 in 4 to 1 in 16, it has been established experimentally that the most advantageous taper for minimum pressure loss is between 1 in 8 and 1 in 10.

The channels resulting from the adjacent truncated aerofoil elements are in the form of "truncated venturis" and exhibit a pressure loss more or less equal to that of venturis with fully completed tapers of the same angle, for the reason that the inertial loss caused by the sudden expansion of the air at the truncated end is balanced or more than balanced by the lower frictional and other losses that have been found to result from a shorter diverging section. The optimum position at which the taper is to be truncated from the point of view of pressure loss depends on the degree of taper, and on the ratio of slot width to overall slot spacing centre-line to centre-line, and for exact determination requires experimental verification. A general rule which is satisfactory for most practical cases is to truncate the taper of the elements just before midway down the tapered section, but the taper may also be truncated at any position before or beyond this position. In a particular set of conditions with a taper of 1 in 9, truncating the taper two-fifths of the way down was found to allow operation at a lower pressure loss than with a completed venturi of optimum taper.

The advantage of the truncated taper is that the cross-sectional depth of the elements is thereby considerably reduced, hence it becomes practical to utilise the most advantageous taper from the point of view of pressure recovery without resulting in excessively deep elements which may be space-consuming and difficult to fabricate. In addition the sudden expansion of the air at the tail provides an added degree of turbulence and mixing without any additional loss of pressure, thus increasing the possibility of collision of particles and resulting in improved agglomeration.

It is to be understood that the use of elements with a completed taper while not so advantageous as the truncated taper is, nevertheless, to be considered as failing within the scope of the invention, when the preferred form of separator is used.

Furthermore, modifications may be used in the profile of the nose or leading section of the aerofoil elements, this being of lesser consequence as regards pressure loss.

The slot and impact section of the secondary stage provides adequate separation of the agglomerated admixture of liquid/solid particles in the air emerging from the primary agglomeration stage. The liquid particles collect to form a film of liquid which runs down the impact pillars thus serving to wash down the deposited particulate matter.

It has been found that by using impact elements such as circular pillars which present a convex front to the slots, the air resistance is considerably lower than with flat or troughed impact plates, and the pressure loss with the impact members in position is little if any greater than the pressure loss through the slots alone, provided the impact distance, i.e. distance from the slot to the impact surface, is not much less than one slot width and the space between adjacent impact members is substantially greater than the slot width. Satisfactory operation has been obtained with impact distances approximately from one to two slot widths.

Experience has shown that with slot velocities in the impact stage up to about 6,000 ft. per minute little or no shearing off or entrainment of collected matter occurs when substantially circular impact pillars are used, and there is no advantage either in entrainment or in resistance in using impact elements of a more elaborate, e.g. aerofoil or "tear-drop" shape. Since the slot velocities in the agglomeration stage may exceed the above velocity by several fold, it is necessary to arrange that the slots in the secondary stage are sufficiently wider, or longer or more numerous to ensure that the impact slot velocity is reduced below the entrainment velocity.

The apparatus may be operated with great economy in spray water consumption; successful operation is obtainable with a quantity of atomized water as low as ⅕ gallon per 1000 cu. ft. of air. Further economy in water usage can be achieved by re-circulation of water after separating solid matter by usual gravitational or other means.

It has been found that the resistance or pressure loss using the apparatus according to the invention is considerably lower than the loss with conventional circular or rectangular venturis at equivalent air throughput and throat velocity, and with the water quantities used therewith. For example, it is possible to operate with a throat velocity of 16,000 ft. per minute at the truncated venturis with an overall pressure loss across the apparatus of about 4 inches water gauge.

Embodiments of the invention are described below with reference to the accompanying drawings in which:

FIGURE 1 is a sectional plan view illustrating the arrangement employing convergent-divergent truncated channels in the primary stage and convergent nozzle-shaped slots with circular impact members in the secondary stage;

FIGURES 2, 3 and 4 are sectional plan views illustrating different profiles for the channel-forming elements;

FIGURE 5 is an isometric view of apparatus incorporating the arrangement illustrated in FIGURE 1, with portions of the casing broken away; and FIGURE 6 is a view illustrating a method of fastening the elements.

Referring to FIGURE 1, the primary stage comprises vertical elements 11 of aerofoil (aerodynamic) shape in cross-section with tapered tails truncated as indicated at 12, disposed adjacent to each other to form vertical channels 13 which are convergent-divergent, i.e. venturi shaped in cross-section and truncated. The secondary stage or eliminator means comprises vertical U-shaped elements 14 disposed adjacent to each other to form vertical nozzle-shaped slots 15 followed by circular impact members 16. The air approaches in the direction of the arrows, and is subjected to a spray of water, steam or the like provided at 17 on the upstream side of the channels.

FIGURE 2 illustrates an aerofoil element with elliptical head 18 and completed taper, which may be used to form the convergent-divergent venturi channels of the primary stage in a similar manner as indicated in FIGURE 1.

FIGURE 3 illustrates a venturi-forming element having a leading edge 19, and a tapered tail truncated at 12, the dotted lines indicating the completed taper.

FIGURE 4 illustrates a venturi-forming element in which the head has a flattened cross-section 20 with rounded edges.

In FIGURE 5 a typical arrangement of the apparatus is shown, the same references being used as in FIGURE 1 to indicate the same elements. The truncated venturi elements 11 are assembled in a casing 22 situated in duct 21, and the slot and impact members 14 and 16 respectively are assembled in casing 23. The assembled elements are inserted and removed through openings 24 and 25 in the casings, which in operation are closed with cover plates (not shown). A sludge removal hopper 26 is provided below the separation section. It will be realized that either or both of the casings, although illustrated as rectangular, may be circular in shape.

It will be realized that while in the impact stage a vertical arrangement of slots and impact members is of advantage to allow drainage of collected liquid/solid material, in the primary venturi stage the channels may be in a vertical, horizontal or inclined position.

In FIGURE 6 a method of assembly is illustrated which may be used for fastening the truncated venturi elements. A support rod 27 having threaded ends is pushed through holes or slots 28 at the upper end of the elements 11. The spacing between the elements and thus the slot width is defined by the spacers 29, and the assembly is fastened together by nuts 30 on the ends of the rod. A similar rod with similar spacers and nuts holds the elements together at the lower end.

A similar method of assembly may be used for the U-shaped elements and the impact pillars. Other simple means of holding together and spacing the elements are feasible and may be used.

Selection of slot width, slot spacing and slot velocity in all the forms of the invention will depend on considerations such as the type of dust or mist, the concentration and size distribution of the particles, the collecting efficiency required, the pressure loss that can be tolerated and like factors. From the descriptions given above, it will be realized that it is a simple matter to adjust the slot dimensions to suit the required operating conditions.

I claim:

Apparatus for removing particulate material from a gas stream, comprising means for confining gas containing particulate material to a path of movement having a substantial horizontal component, a single row only of guide elements extending transversely across said path, said elements having aerofoil cross sections the downstream tapered portions of which are truncated, said elements being spaced apart and defining between themselves a plurality of channels extending in the direction of said path and having convergent-divergent shape in cross section, spray means for introducing liquid into said path upstream of said guide elements, and eliminator means having upright surfaces extending across said path, said eliminator means being spaced a substantial horizontal distance downstream from said guide elements whereby the turbulence induced by the truncation of said guide elements causes the particulate material to agglomerate in the space between said guide elements and said eliminator means and the agglomerated material strikes and is stopped by said upright surfaces and falls by gravity a substantial horizontal distance from said guide elements.

References Cited by the Examiner

UNITED STATES PATENTS

| | | | |
|---|---|---|---|
| 1,138,081 | 5/15 | Carrier | 261—108 |
| 1,978,546 | 10/34 | McCombie | 55—257 |
| 1,989,774 | 2/35 | Snow | 261—111 |
| 2,080,713 | 5/37 | Hayes | 261—110 |
| 2,207,272 | 7/40 | Simons | 261—111 |
| 2,608,398 | 8/52 | Park et al. | 261—109 |

FOREIGN PATENTS

| | | |
|---|---|---|
| 394,895 | 5/24 | Germany. |
| 20,944 | 1904 | Great Britain. |
| 728,981 | 4/55 | Great Britain. |
| 498,585 | 9/54 | Italy. |

HARRY B. THORNTON, *Primary Examiner.*

HERBERT L. MARTIN, RONALD R. WEAVER,
*Examiners.*